United States Patent

[11] 3,590,682

[72] Inventors Carl Ort
 Stuttgart-Bad Cannstatt;
 Kurt Deininger, Stuttgart-Sillenbach;
 Alfred Kilgus, Stuttgart-Wangen, all of,
 Germany
[21] Appl. No. 647,712
[22] Filed June 21, 1967
[45] Patented July 6, 1971
[73] Assignee Eastman Kodak Company
 Rochester, N.Y.
[32] Priority July 20, 1966
[33] Germany
[31] K59825

[54] ALBADA VIEWFINDER INCLUDING PRISMATIC REFLECTING MEANS DEFINING AN IMAGE
 1 Claim, 4 Drawing Figs.
[52] U.S. Cl. .................................................. 88/1.5 R
[51] Int. Cl. ............................................... G03b 13/04
[50] Field of Search ....................................... 350/103, 102; 88/1.5

[56] References Cited
UNITED STATES PATENTS

| 2,217,930 | 10/1940 | Zimmermann | 88/1.5 |
| 3,309,554 | 3/1967 | Lorenzo | 350/102 UX |
| 3,377,911 | 4/1968 | Mische et al. | 88/1.5 |
| 3,379,092 | 4/1968 | Papke | 88/1.5 |

Primary Examiner—Ronald L. Wibert
Assistant Examiner—Orville B. Chew, II
Attorneys—R. W. Hampton and William F. Delaney, Jr.

ABSTRACT: A brilliant reflective reticle frame for limiting the viewing filed in an Albada viewfinder is disclosed, which is defined by a highly reflective surface of a plastic support member.

PATENTED JUL 6 1971  3,590,682
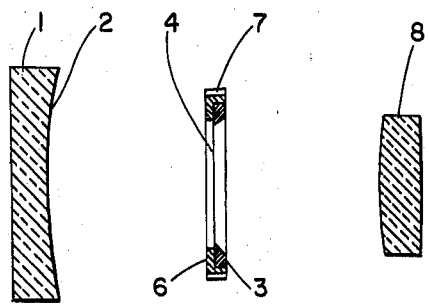
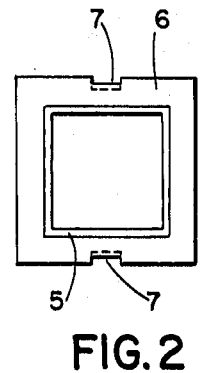
FIG.1  FIG.2
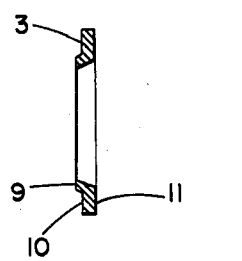
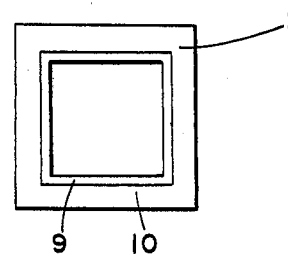
FIG.3
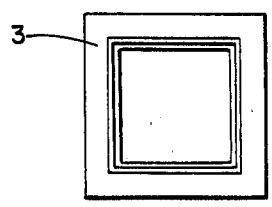
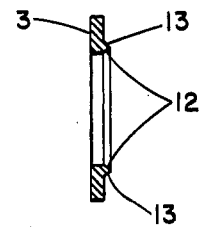
FIG.4
CARL ORT
ALFRED KILGUS
KURT DEININGER
INVENTORS
BY William F. Delaney Jr.
Robert W. Hampton
ATTORNEYS

ALBADA VIEWFINDER INCLUDING PRISMATIC REFLECTING MEANS DEFINING AN IMAGE

This invention relates to Albada viewfinders, and in particular to Albada viewfinders in which a bright frame image, limiting the viewfinder image, is depicted approximately at infinity by a semireflecting hollow mirror, so that the viewfinder image and the frame image are simultaneously in focus.

An Albada viewfinder comprises a reverse-Galilean viewfinder lens in combination with a hollow mirror which forms an image of a reflective frame in the virtual image plane of the negative viewfinder lens. Both images are sharply in focus to the eye through the viewfinder eyepiece. Owing to the requirement that the image-limiting frame be highly reflective, it is usually produced in such Albada viewfinders by evaporating a narrow frame of aluminum in a high vacuum onto a glass plate. When the viewfinder is relatively short or the light admitting aperture is sufficiently large, the image-limiting frame can be mounted on the inside of the viewfinder window or the viewfinder eyepiece. This type of frame is particularly well suited to block type Albada viewfinders in which the space between the negative objective and the eyepiece is filled with glass.

For evaporating the image-limiting frame, expensive devices are necessary to guarantee that the frame is accurately positioned on the glass plate or the eyepiece. Tolerances must be on the order of some tenths of millimeters in the positioning of the frame to avoid incorrectly outlining the viewfinder image. One solution of this problem has been to use a metal foil or a metal sheet for the image-limiting frame whose surface can be polished or grained. The center of the sheet is cutout to provide an aperture for the viewfinder image. This reflective frame is outlined by a second metal sheet having a black lacquer finish and a cutout central portion which is larger than that of the first sheet to define the width of the image-limiting frame. However, the surfaces of sheet metal or foils are not adequately reflective for use as brilliant reflective reticles for framing the field in Albada viewfinders.

It is an object of this invention to provide an improved reflective frame for Albada viewfinders.

It is another object of this invention to provide a distinctly outlined highly reflective frame from Albada viewfinders.

These objects are accomplished according to the present invention by the use of a plastic support member having a highly reflective surface defining the image-limiting frame. The support member is provided with an aperture which is in alignment with the viewfinder field. A higher reflectivity may be obtained using a plastic support for the reflective surface than can be obtained with sheet metal or foil. In addition such plastic carriers provide more and cheaper possibilities of design than are available with sheet metal or glass.

Further objects and advantages of the invention will be apparent from the following description of the several embodiments taken in connection with the accompanying drawings, wherein:

FIG. 1 is a schematic sectional view of an Albada viewfinder incorporating a reflective frame in accordance with the invention;

FIG. 2 is a plane view of the image-limiting limiting frame depicted in FIG. 1;

FIG. 3 includes a cross-sectional and a plane view of an image limiting frame according to another embodiment of the invention.

FIG. 4 shows views similar to FIG. 3 of another embodiment of the invention.

In FIG. 1 a reverse-Galilean viewfinder is shown having a negative objective lens 1 and a positive eyepiece 8. The rear or inside surface 2 of objective 1 is coated with a reflective material to form a hollow mirror. Between the two lens elements is located an image-limiting frame according to the invention. The frame comprises a plastic support member 3 having a reflective surface which faces lens 1. A layer of aluminum is evaporated on the front surface of member 3 to provide a frame, which is more highly reflective than sheet metal or foil. The support member 3 has an aperture 4 cut out of its central area to permit the passage of the viewfinder image light. As shown in FIGS. 1 and 2, a masking plate 6 having a black lacquer finish is rigidly mounted to support member 3 by projections 7. Plate 6 has an aperture larger than that in support member 3, so that a narrow strip 5 of reflective aluminum remains uncovered. An image of reflective strip 5 is formed by the objective lens 1 in the virtual image plane of the objective, so that a bright-line reticle appears to frame the viewed field.

Another embodiment of the image-limiting frame is shown in FIG. 3, in which the support member 3 is made from a transparent plastic. The support member 3 is provided with a protruding portion defining a frame-shaped narrow surface 9 on which aluminum is evaporated. During the evaporation process, surface 10 is covered, so that surfaces 10 and 11 are transparent. According to this embodiment, the viewed field extends beyond the image-limiting frame.

According to another embodiment of the invention disclosed in FIG. 4, the reflective line of the image-limiting frame is produced by a reflecting roof prism, viz. surfaces 12 and 13, which is cast to the support member 3. Light from the objective 1 which strikes either surface 12 or 13 is caused to be reflected back upon itself to the hollow mirror thus forming a bright image of said prism which can be viewed through the viewfinder eyepiece. This embodiment can be manufactured more cheaply than the other embodiments, because it can be injection molded and because the evaporation of aluminum can be dispensed with.

Although the invention has been described in considerable detail with reference to certain preferred embodiments thereof, it will be understood that variations and modifications can be effected without departing from the spirit and scope of the invention as described hereinabove and as defined in the appended claims.

We claim:

1. A reflective frame adapted to frame a viewfinder image field in an Albada viewfinder system, said frame comprising:
   a plastic support member having an optical aperture, said aperture being optically aligned with the viewfinder system; and
   prismatic reflecting means integrally formed on the support member defining a reflective reticle, said reflecting means generally enclosing the optical aperture through the support member.